Sept. 11, 1956 K. F. GALLIMORE 2,762,269
LUBRICATING SYSTEM FOR MACHINE TOOLS
Original Filed Sept. 16, 1947 2 Sheets-Sheet 1
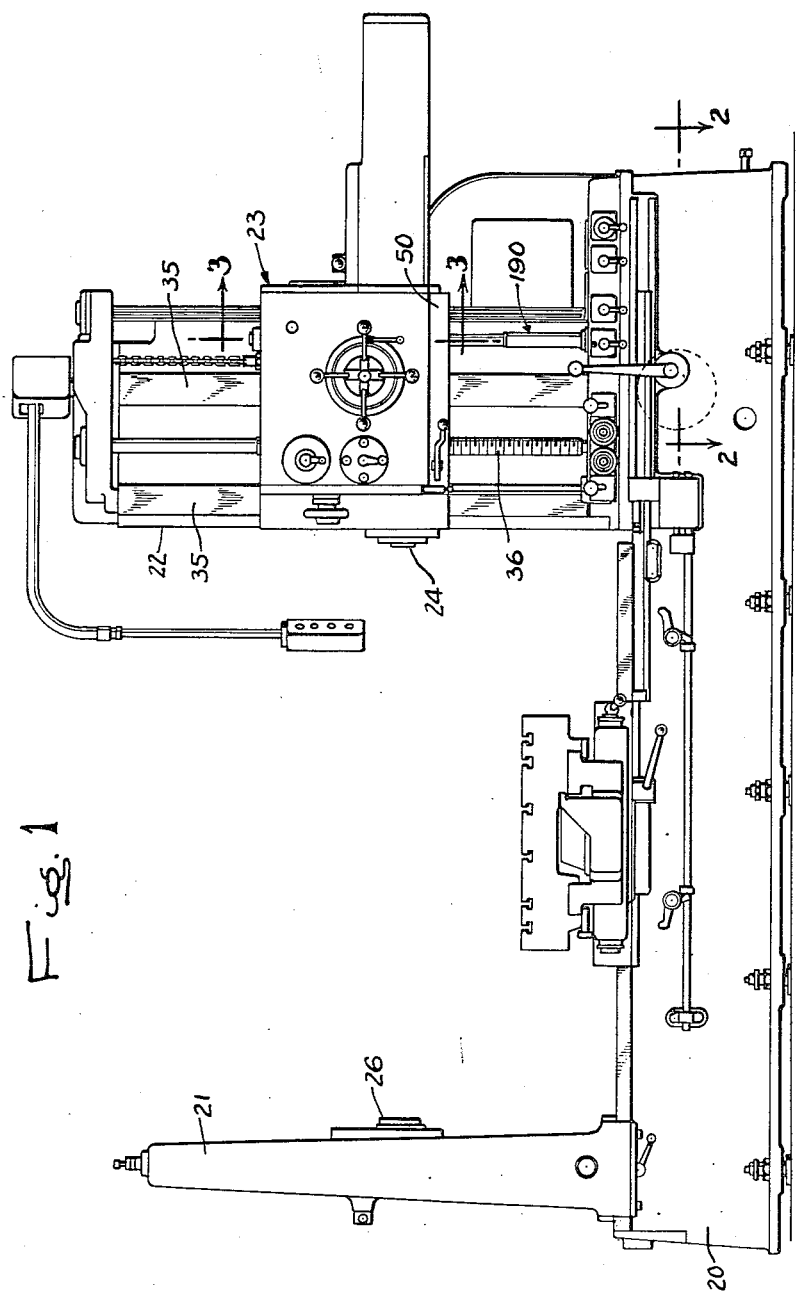
INVENTOR
Keith F. Gallimore
By Carlson, Pitzner, Hubbard & Wolfe
ATTORNEYS Sept. 11, 1956　　　　K. F. GALLIMORE　　　　2,762,269
LUBRICATING SYSTEM FOR MACHINE TOOLS
Original Filed Sept. 16, 1947　　　　2 Sheets-Sheet 2
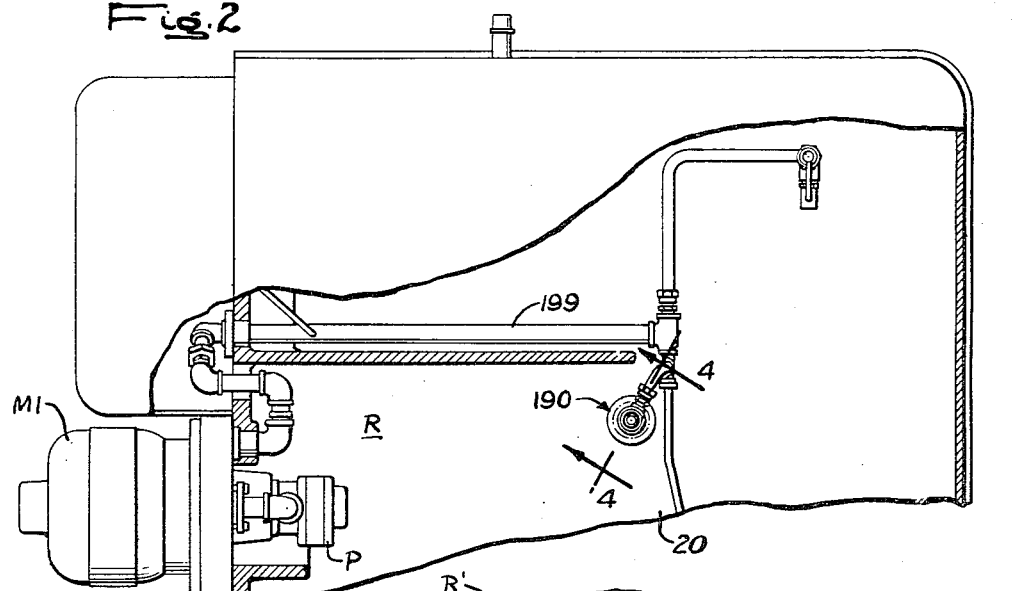
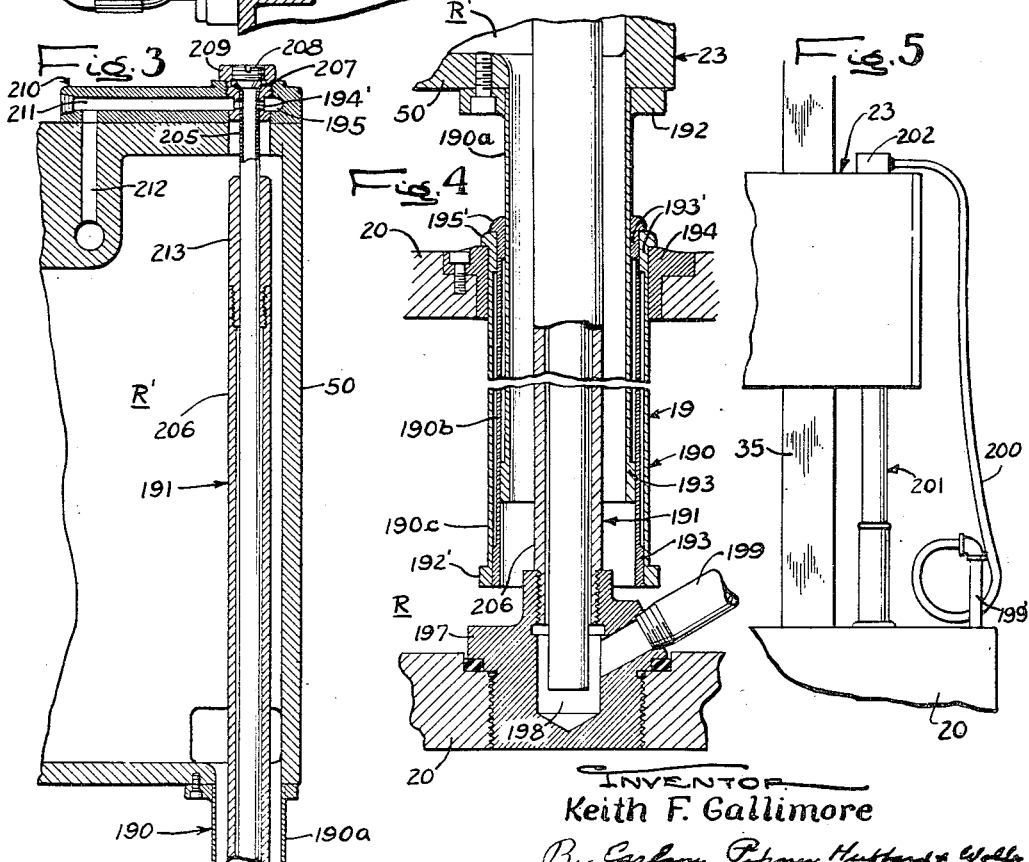
INVENTOR
Keith F. Gallimore
ATTORNEYS

United States Patent Office 2,762,269
Patented Sept. 11, 1956

2,762,269

LUBRICATING SYSTEM FOR MACHINE TOOLS

Keith F. Gallimore, Fond du Lac, Wis., assignor to Giddings & Lewis Machine Tool Company, Fond du Lac, Wis., a corporation of Wisconsin Original application September 16, 1947, Serial No. 774,308, now Patent No. 2,643,441, dated June 30, 1953. Divided and this application January 17, 1952, Serial No. 266,929

3 Claims. (Cl. 90—11)

The invention relates to machine tools of the type having a tool spindle and associated drive mechanism incorporated in a headstock which is supported on ways for adjustment relative to the machine base, and it is more particularly concerned with the lubricating system provided in such machines.

The present application is a division of my copending application Serial No. 774,308 filed September 16, 1947, now Patent No. 2,643,441, granted June 30, 1953.

Machine tools of the above general character are commonly designed for machining comparatively large workpieces and consequently the spindle headstock must be supported at or capable of adjustment to a substantial distance from the machine bed. Support for the headstock is usually provided by a way structure along which it may be shifted to the selected positions of adjustment required by different jobs, the headstock, of course, being rigidly clamped to the way structure during machining operations.

To adapt such machine tools for precision machining the component parts are constructed and assembled so as to locate and align the tool spindle very accurately with respect to certain fixed portions of the machine. Considerable difficulty has been experienced in maintaining accurate spindle alignment in machine tools designed to operate at spindle speeds suitable for present day high speed machining practice. This is due in a large part to the warping or bowing of the way structure as a result of localized temperature changes in the structure. In this connection it may be noted that a relatively great amount of heat is generated in a high speed headstock and the transfer of such heat to the way structure proceeds quite rapidly, particularly when the headstock is clamped to the ways. Even with the sturdiest and most rigid construction practicable, such localized heating of the way structure results in warping or bending of the same and consequent displacement of the spindle from its normal position. In some instances it has been found that the center line of the spindle may be shifted several thousandths of an inch when the machine is started until it reaches a constant running temperature which may take several hours. Furthermore, variations in headstock temperature may affect the preload on the spindle bearing to an extent sufficient to interfere with its precision operation.

With the above in mind the primary object of the present invention is to provide for machine tools of the above general character an improved lubricating system which, in addition to affording complete and efficient lubrication of the moving parts of the headstock, also serves effectively to dissipate the heat generated therein so as to keep the headstock temperature relatively low and avoid undesirable localized heating of the way structure.

Another object of the invention is to provide an improved system for supplying lubricant to the component parts of the headstock of a machine tool of the above general character which permits the use of a greater volume of lubricant and facilitates cooling of the same, thus avoiding overheating of either the lubricant or the machine.

Still another object is to provide improved conduit means for circulating lubricant or other fluids between a movable machine headstock and a reservoir disposed in the stationary base upon which the headstock is supported.

Other objects and advantages of the invention will become apparent from the following detailed description of the preferred embodiment illustrated in the accompanying drawings, in which:

Figure 1 is a front elevational view of a machine tool equipped with a lubricating system embodying the features of the invention.

Fig. 2 is a horizontal sectional view through the base or bed of the machine taken in a horizontal plane substantially on the line 2—2 of Fig. 1.

Fig. 3 is a sectional view of the headstock taken in a vertical plane substantially on the line 3—3 of Fig. 1.

Fig. 4 is a fragmentary sectional view of the lubricating conduit system taken in a plane substantially on the line 4—4 of Fig. 2.

Fig. 5 is a fragmentary elevational view of a modified form of the lubricating system.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawings, the machine selected to illustrate the invention is commonly known as a horizontal boring, milling and drilling machine. It comprises generally, an elongated horizontal bed 20 of massive construction having an end support or tailstock column 21 at one end and a headstock column 22 at the other end. The latter column supports a vertically adjustable headstock 23 equipped with a horizontally disposed axially slidable tool spindle 24.

The tailstock column 21 supports a vertically adjustable end block or tailstock 26 which cooperates in well known manner with the spindle 24 in supporting a boring bar (not shown) or similar elongated tool member. The column 21 is adjustable longitudinally of the machine bed for the accommodation of boring bars of different lengths.

The column 22 as herein shown is in the form of an upright hollow casting bolted or otherwise rigidly secured to the top of the machine bed 20 adjacent one end of the bed. The column is provided at its front face with spaced parallel vertical ways 35 for supporting and guiding the headstock 23 in its vertical adjustments. Such adjustments are effected through the medium of a feed screw 36 rotatably anchored at its upper end on the column and coacting with a suitable nut provided in the headstock.

The headstock 23 may be of any suitable character, that shown being of the general type disclosed in the Gallimore et al. Patent No. 2,400,819 issued May 21, 1946. It includes a generally rectangular housing 50 which includes suitable gearing for rotating and axially translating the tool spindle 24. The present invention is not concerned with the details of the gearing, but with the problem of supplying lubricant such as oil to the headstock for the lubrication of that gearing and other movable elements in or associated with the headstock 23.

In accordance with the invention, provision is made for accommodating a main oil supply reservoir R (Fig. 2) within the machine bed 20 and for effecting continuous circulation of oil between the reservoir R and a sub-reservoir R' (Fig. 3) in the headstock 23. To accommodate the adjusting movements of the headstock, such circulation of lubricant is maintained through an extensible conduit system connecting the reservoir and the sub-reservoir. By thus locating the main reservoir in the machine bed a much greater volume of oil can be accommodated, thereby avoiding overheating of the oil and consequent objectionable temperature rise in the headstock. Moreover, the heat removed from the headstock by the oil may be effectively dissipated in the heavy structure forming the machine bed without adverse effects on the alignment of the spindle or other working parts of the machine.

Referring to Figs. 2–5 of the drawings, the extensible conduit system for connecting the reservoir R and sub-reservoir R' preferably comprises a pair of telescoping conduit assemblies 190 and 191 arranged one within the other to define a pair of contiguous flow passages. The larger or outer conduit assembly comprises in this instance three telescopingly assembled sections 190a, 190b and 190c of progessively increasing diameter. The inner or smaller conduit section 190a is provided at its upper end with a flange 192 adapted to be secured to the bottom wall of the headstock housing 50 as by machine screws. The interior of this conduit section opens into the bottom of the sub-reservoir R' in the headstock.

As shown in Fig. 4, the outer conduit section 190c is slidably received in a bushing 194 secured in the top wall of the machine bed 20. Such top wall in this instance defines the top of the main lubricant reservoir R and the conduit assembly 190 thus provides a passage for the free flow of lubricant from the sub-reservoir R' in the headstock to the main reservoir in the machine bed. A circumferential flange 192' adjacent the lower end of the section 190c prevents accidental withdrawal of the same from the bushing 194.

The conduit section 190b is interposed between the sections 190a and 190c, the sections being relatively slidable endwise and provided with suitable sealing means for preventing leakage of lubricant therebetween. The sealing means preferably comprises outwardly offset bearing surfaces 193 adjacent the lower ends of the sections 190a and 190b and inwardly offset bearings surfaces 193' adjacent the upper ends of the sections 190b and 190c. These bearing surfaces engage the adjacent surface of the companion sections to seal the conduit against leakage. In addition each section thus presents a radially directed shoulder adapted to cooperate to prevent withdrawal of one section from the other. The sections 190b and 190c are also provided at their upper ends with outwardly directed flanges 195' operative to limit their inward or telescoping movement.

It will be apparent that the telescoped construction of the conduit assembly 190 above described permits the sections to be extended or collapsed as required to accommodate the movements of the headstock away from or toward the machine bed. Preferably the main reservoir R is made of sufficient depth to afford clearance for the sections when the headstock is moved into its lowermost position closely adjacent the top wall of the machine bed. It will be understood, of course, that the conduit sections are dimensioned and are provided in sufficient number to extend to the length required for movement of the headstock to its uppermost position.

The inner conduit assembly 191 also comprises a plurality of sections assembled in telescoping relation, there being two sections 205 and 206 in the particular construction illustrated in Fig. 3. The innermost section 205 is formed with an outwardly flaring upper end portion 207 anchored by a locking screw 208 in a plug 209 secured in a cover plate 210 mounted on the upper wall of the headstock housing 50. Apertures 194' adjacent the upper end of the conduit section 205 open into an annular chamber 195 formed in the cover plate 210 from which a duct 211 extends to a duct 212 in communication with the sub-reservoir R' in the headstock.

At its lower end the inner casing section 205 is open to the outer casing section 206. This latter section is provided at its upper end with a detachable sleevelike element 213 which slidably engages the outer wall of the inner section and forms an oil-tight seal therewith. At its lower end the conduit section 206 is threaded into a fitting 197 which has an internal chamber 198 to which the lubricant or oil is supplied by way of a pipe 199. The fitting 197 may be conveniently threaded into the portion of the machine bed 20 constituting the bottom wall of the reservoir R.

In the exemplary embodiment of the invention oil is supplied under pressure through the pipe 199 by a suitable pump P (Fig. 2) driven by an electric motor M1. The pump is arranged to withdraw oil from the reservoir R and force it through the pipe 199 into the chamber 198 from whence it passes upwardly through the conduit assembly 191, chamber 195 and ducts 211 and 212 to the sub-reservoir R'. The oil in the sub-reservoir is distributed to the gear and other elements enclosed in the headstock housing in the usual manner. Used oil returned to the sub-reservoir after circulation through the gearing and other moving elements in the headstock returns to the main reservoir R by way of the outer conduit assembly 190. Such oil, of course, mixes with the large volume in the main reservoir and is thus cooled, cooling being further facilitated by the relatively large mass of the machine bed in which the main reservoir is formed.

In the modified form of lubricating system shown in Fig. 5 of the drawings, the pump P in the main reservoir R is arranged to discharge the oil under pressure through a pipe 199' projecting from the top of the machine bed 20. The oil is carried from this pipe through a flexible tube 200 to a suitable fitting 202 on the headstock housing 23 through which it is discharged into the sub-reservoir R' in the headstock. Used oil is returned to the main reservoir through a telescoping tubular conduit assembly 201 which may be similar in construction to the conduit assembly 190 heretofore described.

It will be apparent from the foregoing that the invention provides a novel lubricating system for machine tools having movable headstocks or the like enclosing gearing and similar elements. By reason of the novel conduit system provided by the invention, the main fluid reservoir may be located in the base of the machine and may be dimensioned to accommodate a relatively large volume of oil. The continuous circulation of this large volume of oil insures the presence of cool oil in the headstock at all times.

I claim as my invention:

1. In a machine tool having a horizontally disposed bed, an upright column on said bed, a spindle headstock supported on said column for vertical adjustment, a lubricating system for said headstock including a lubricant reservoir located in said bed, a pair of conduits extending between said headstock and said bed, said conduits being arranged one within the other to provide contiguous passages for the flow of lubricant from said reservoir to said headstock and from said headstock back to said reservoir, each of said conduits comprising a plurality of telescoping tubular sections adapted to be extended or collapsed to accommodate themselves to the various adjusted positions of said headstock on said column, the lower sections of both conduits being secured to said bed so that the conduits may be projected into the bed throughout substantially their entire lengths to allow the headstock to approach said bed closer than the length of either of the lower conduit sections.

2. In a machine tool having a stationary bed, an upright column on said bed, a spindle headstock supported on said column for vertical adjustment, a lubricating system for said headstock including a sub-reservoir in the headstock, a main reservoir in the machine bed, an extensible conduit assembly connecting said main and sub-reservoirs, said assembly comprising a plurality of tubular sections telescopingly fitted together, one of said sections being secured to said headstock and another section being slidably received in a bushing secured to the machine bed so that the assembly when collapsed is substantially entirely located within the main reservoir, and a flange on said other section effective to prevent withdrawal of the section from said bushing.

3. In a machine tool having a stationary bed, an upright column on said bed, a spindle headstock supported on said column for vertical adjustment, a lubricating system for said headstock including a sub-reservoir in the headstock, a main reservoir in the machine bed, an extensible conduit assembly connecting said main and sub-reservoirs, said assembly comprising a plurality of tubular sections telescopingly fitted together, means securing one of said sections to said headstock in communication with said sub-reservoir, another of said sections being slidably fixed to the machine bed in communication with said main reservoir so that the assembly when collapsed is located within the main reservoir, and a second conduit assembly extending through said first conduit assembly, said second conduit assembly including a plurality of tubular sections telescopingly fitted together, and means securing respective sections of said second conduit assembly to said headstock and to the machine bed.

References Cited in the file of this patent

UNITED STATES PATENTS

| | | |
|---|---|---|
| 1,323,268 | Hanson | Dec. 2, 1919 |
| 1,782,235 | Kearney | Nov. 18, 1930 |
| 2,069,296 | Woytych | Feb. 2, 1937 |
| 2,093,757 | Godfriaux | Sept. 21, 1937 |
| 2,220,068 | Eckardt | Nov. 5, 1940 |
| 2,254,163 | Zimmerman | Aug. 26, 1941 |
| 2,385,393 | Wilson | Sept. 25, 1945 |
| 2,430,127 | Kronenberg | Nov. 4, 1947 |
| 2,452,674 | Nenninger | Nov. 2, 1948 |